United States Patent [19]

Takasugi et al.

[11] Patent Number: 5,265,705
[45] Date of Patent: Nov. 30, 1993

[54] METHOD OF PREVENTING WHEEL LOADER FROM SLIPPING

[75] Inventors: Shinji Takasugi; Masayuki Mori, both of Kanagawa, Japan

[73] Assignee: Kabushiki Kaisha Komatsu Seisakusho, Japan

[21] Appl. No.: 855,626

[22] PCT Filed: Nov. 16, 1989

[86] PCT No.: PCT/JP90/01505

§ 371 Date: May 5, 1992

§ 102(e) Date: May 5, 1992

[87] PCT Pub. No.: WO91/07604

PCT Pub. Date: May 30, 1991

[30] Foreign Application Priority Data

Nov. 17, 1989 [JP] Japan ................................ 1-299414

[51] Int. Cl.⁵ ...................... F16D 43/04; F16D 43/28
[52] U.S. Cl. ........................... 192/0.032; 192/0.075; 192/0.096; 192/103 F; 180/197; 364/426.01
[58] Field of Search ............... 192/0.032, 0.033, 0.075, 192/0.076, 0.096, 3.31, 3.58, 103 F, 104 R; 180/197; 364/426.03, 426.01

[56] References Cited

U.S. PATENT DOCUMENTS

| | | | |
|---|---|---|---|
| 4,428,467 | 1/1984 | Hiramatsu | 192/3.31 |
| 4,866,624 | 9/1989 | Nishikawa et al. | 180/197 X |
| 4,884,650 | 12/1989 | Fujiki et al. | 180/197 |
| 4,936,405 | 6/1990 | Hrovat | 180/197 |
| 4,937,750 | 6/1990 | Gilliam | 192/103 F X |
| 4,942,950 | 7/1990 | Watanabe et al. | 192/0.096 |
| 4,953,654 | 9/1990 | Imaseki et al. | 364/426.03 X |
| 4,989,686 | 2/1991 | Miller et al. | 180/197 |
| 5,004,064 | 4/1991 | Tezuka et al. | 364/426.03 X |
| 5,016,724 | 5/1991 | Steinhagen et al. | 180/197 |
| 5,020,622 | 6/1991 | Hrovat | 180/197 |
| 5,065,835 | 11/1991 | Richter et al. | 180/197 |
| 5,092,435 | 3/1992 | Sone et al. | 364/426.03 X |
| 5,107,430 | 4/1992 | Magnino | 180/197 X |
| 5,119,298 | 6/1992 | Naito | 180/197 X |

FOREIGN PATENT DOCUMENTS

| | | |
|---|---|---|
| 47-35558 | 11/1972 | Japan. |
| 57-163731 | 10/1982 | Japan. |
| 61-129330 | 6/1986 | Japan. |
| 62-288732 | 12/1987 | Japan. |

Primary Examiner—Leslie A. Braun
Assistant Examiner—Andrea Pitts
Attorney, Agent, or Firm—Ronald P. Kananen

[57] ABSTRACT

A method of preventing a wheel loader from slipping, aiming at reducing the amount of slip of the loader during excavating operation using it, and preventing the decline in operational efficiency due to the slip. The method of preventing a wheel loader from slipping comprises the steps of detecting the occurrence of slip in accordance with the difference in the number of revolutions between a pair of left and right drive wheels and the change thereof, and controlling the clutch pressure so that the clutch is put in half-clutch condition upon detection of the occurrence of slip.

19 Claims, 4 Drawing Sheets

METHOD OF PREVENTING WHEEL LOADER FROM SLIPPING

TECHNICAL FIELD OF THE INVENTION

This invention relates to a method of preventing a wheel loader from slipping, and more particularly to a method of preventing a wheel loader from slipping whereby the amount of slip of the loader in operation can be reduced.

BACKGROUND ART OF THE INVENTION

A prior art method of preventing a wheel loader from slipping is disclosed in the Japanese Laid-Open Patent Application No. SHO 64-4013. According to this prior art method of preventing the loader from slipping, a slip controlling device conducts processing of information on the basis of an input signal from a detector for detecting the load on an implement, and outputs a command signal for controlling the implement and a command signal for controlling the force of traction upon generation of slip of the vehicle so that the output signals permit the implement to effect compensating operation so as to reduce the loading thereon.

Besides the above-mentioned prior art method, in general, methods of controlling the output of the engine or controlling the brake when the wheel loader is slipping could be envisaged.

Out of the above-mentioned prior art methods, according to the former method, since the load on the implement is automatically reduced when the vehicle is slipping, that is, no-load condition is reached, so that a situation against the intention of the operator will occur if this method is effected.

Further, according to the latter method in case wheel loader slips during excavating operation, even if the operator detects the occurrence of slip and takes procedures to control it, it takes about 0.5 to 1.0 second until the slip is restrained. Therefore, in case of the method of controlling the output of the engine, the response is slow, and in case of the method of controlling the brake, the braking action tends to be delayed, so that both the methods have been ineffective.

SUMMARY OF THE INVENTION

The present invention has been made in view of the above-mentioned circumstances in the prior art, and has for its object to provide a method of preventing a wheel loader from slipping so that the amount of slip of the loader during excavating operation using it can be reduced, and also the decline in the operational efficiency due to the slip can be prevented.

To achieve the above-mentioned object, according to one aspect of the present invention, there is provided a method of preventing a wheel loader from slipping comprising the steps of detecting the occurrence of slip in accordance with the difference in the number of revolutions between a pair of left and right drive wheels and the change thereof, and controlling the clutch pressure so that the clutch is put in half-clutch condition upon detection of the occurrence of slip.

Further, according to the present invention, there is provided a method of preventing a wheel loader from slipping as set forth in the above-mentioned aspect, wherein said detection of slip is conducted when the force of traction exceeds a preset value.

Still further, according to the present invention, there is provided a method of preventing a wheel loader from slipping as set forth in the above-mentioned aspect, wherein said clutch pressure control is released when the implement is in operation and the fluid pressure in the buttom chamber of a boom cylinder is 100 kg/cm$^2$ or over, or when the number of revolutions of the engine is 1,300 r.p.m or under.

Thus, according to the method of preventing a wheel loader from slipping, upon detection of the occurrence of slip from the difference in the number of revolutions between the pair of left and right drive wheels, the clutch pressure is controlled immediately so as to eliminate the slipping condition without having to reduce the load on the implement.

Further, the clutch pressure control is released by conducting such operation of the implement as the lip is eliminated when the implement is in operation, thereby returning to the normal operating condition quickly.

An effect obtainable by the present invention is that upon generation of slip of a wheel loader in operation the clutch pressure is controlled immediately so that this slipping condition can be eliminated without having to reduce the load on the implement, thereby enabling the amount of slip of the wheel loader in excavating operation to be reduced, and also the operation as intended by the operator to be conducted always without the need for reducing the load on the implement when the wheel loader is slipping.

Another effect of the present invention is that the above-mentioned detection of generation of slip can be conducted quickly even when the wheel loader is running on uneven land.

The above-mentioned and other objects, aspects and advantages of the present invention will become apparent to those skilled in the art by making reference to the following detailed description and the accompanying drawings in which a preferred embodiment incorporating the principles of the present invention is shown by way of example only.

DETAILED DESCRIPTION OF PREFERRED EMBODIMENT

A preferred embodiment of the present invention will be described in detail below with reference to the accompanying drawings.

Figure 6:
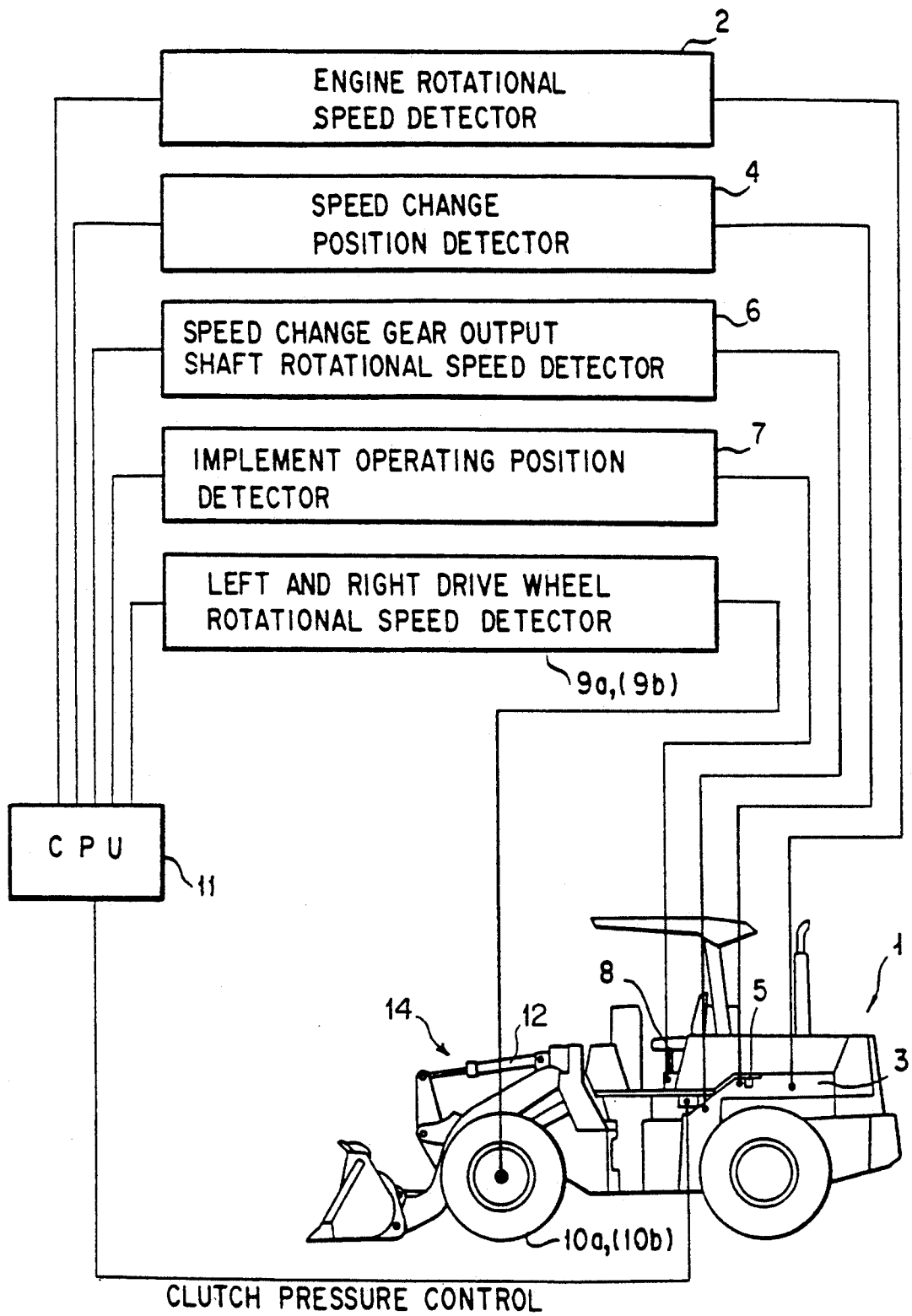
FIG. 6 is a schematic, constructional explanatory view showing the wheel loader and sensors.

In FIG. 6, reference numeral 1 denotes a wheel loader, 2 an engine rotational speed detector for detecting the number of revolutions of an engine 3 of the loader, 4 a speed position detector for detecting the speed change position of a speed change gear 5, 6 an output shaft rotational speed detector for detecting the number of revolutions of the output shaft of the speed change gear 5, 7 an implement operating position detector such as a limit switch, etc. for detecting the operating position of an implement operating device 8, and 9a, 9b left and right drive wheel rotational speed detector for detecting the number of revolutions of left and right drive wheels 10a, 10b, respectively. Reference numeral 11 indicates a CPU (central processing unit) adapted to receive a detection signal from each of the above-mentioned detectors 2, 4, 6, 7, 9a and 9b as input thereof and transmit a predetermined control signal as output thereof to a clutch control unit 12.

Figure 1:
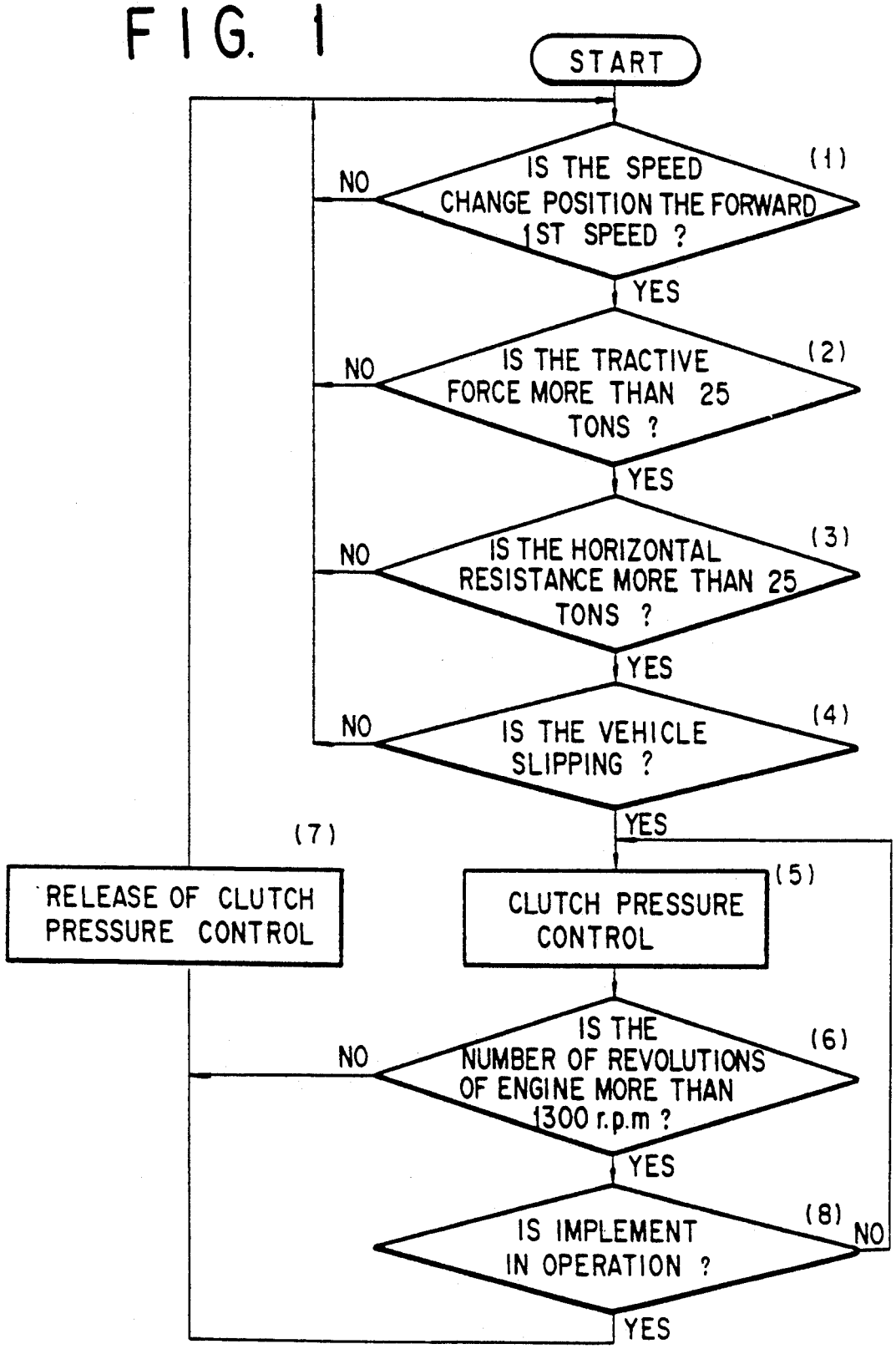
FIG. 1 is a flowchart showing steps, in the method of preventing a wheel loader from slipping according to the present invention.

One embodiment of the method of preventing the above-mentioned wheel loader from slipping will be described according to the flowchart as shown in FIG. 1.

In the first place, a speed change position of the wheel loader 1 which is running is detected by the speed change position detector 4, and it is discriminated by the CPU 11 whether the speed change position is the forward first speed (F1). (STEP 1)

When it has been discriminated at STEP 1 that the speed change position is the forward first speed, the force of traction at that time is computed by CPU 11 on the basis of the detection signals transmitted by the speed change position detector 4 and the output shaft rotational speed detector 6, and then a comparison is made or whether or not the force of traction is more than a reference value which is, for example, 25 tons. (STEP 2) As a result, if it is more than 25 tons, a horizontal resistance is then computed by CPU 11 on the basis of both the above-mentioned signals, and then a comparison is made on whether or not the horizontal resistance is more than a reference value which is, for example, 25 tons (STEP 3) As a result, if it is more than 25 tons, slip of the drive wheels 10a, 10b is sensed. (STEP 4)

It is discriminated that the wheel loader is slipping when the average running speed of the loader is more than 1 km/hour and the speed ratio of drive wheels 10a and 10b is more than 2, or the differentiated value of rotational speed difference a km/hour between the left and right drive wheels 10a and 10b is more than $|0.2|$ g.

At each of the above-mentioned steps 1-4, if the result of discrimination is NO, then the system is returned to STEP 1.

If it is detected at STEP 4 that the wheel loader 1 is slipping, then a control signal for controlling half-clutch is outputted by the CPU 11 to the clutch control unit so that the clutch pressure is controlled to allow the clutch to be put automatically in half-clutch condition. (STEP 5)

Subsequently, the operator will reduce the amount of depression of the accelerator pedal by his foot to reduce the number of revolutions of the engine and compare it with 1,300 r.p.m, for example (STEP 6), and release the above-mentioned clutch pressure control if the number of revolutions of the engine becomes less than 1,300 r.p.m. (step 7) In case at the above-mentioned STEP 6 the number of revolutions of the engine does not drop, and is 1,300 r.p.m or more, then the operator operates the implement (STEP 8), and release the clutch pressure control when the fluid pressure in the bottom chamber 12 of the boom cylinder 14 reaches 100 kg/cm$^2$ or more, for example. When a predetermined load is applied to the implement, the drive wheels 10a, 10b, which are front wheels, are subjected to a vertical load, so that even in case the number of revolutions of the engine is more than 1,300 r.p.m the slip of the drive wheels is eliminated. In this condition, the above-mentioned clutch pressure control is released. (STEP 7)

In case the load on the implement is low at STEP 8, then the system is returned to STEP 5.

Figure 2:
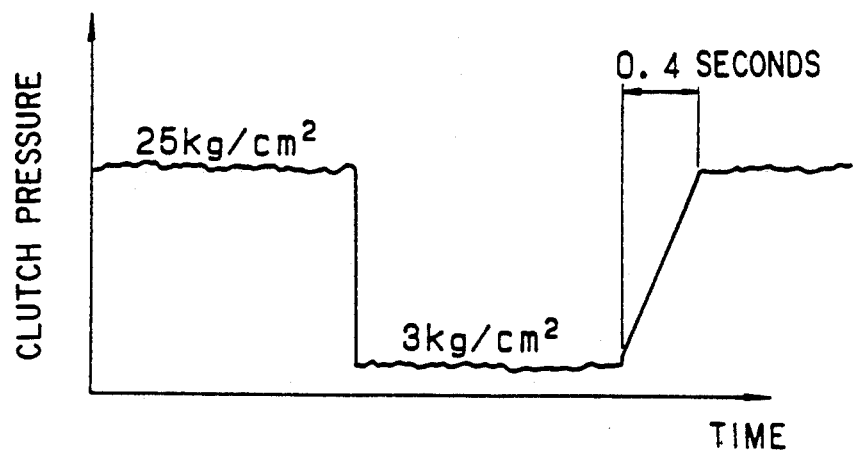
FIG. 2 shows control in clutch pressure.

The clutch pressure control at the above-mentioned STEP 5 is made as shown in FIG. 2. When it is detected that the wheel loader is slipping, the clutch pressure will drop to a value in the range of 25 to 35 kg/cm$^2$ so that the clutch is put in half-clutch condition, whilst upon release of the clutch pressure control the clutch pressure will be restored to the original value of 25 kg/cm$^2$ in 0.4 seconds.

The conditions required for releasing this clutch pressure control are the operation of the implement and the drop in the number of revolutions of the engine as mentioned above.

Further, in the above-mentioned embodiment, it is sometimes impossible for wheel loaders adapted to be driven mainly on uneven land to detect quickly the occurrence of slip from the difference in the number of revolutions between the left and right drive wheels 10a and 10b. This is due to the fact that since both the drive wheels 10a and 10b trace the road surface when the loader runs on the stone, etc. during its running on uneven land, a pseudo-slip signal is generated so that it takes a longer time to detect the occurrence of slip, that is, a time delay for confirmation of the slip occurs.

However, in the ordinary earth excavating operations by a wheel loader, since the bucket of the loader is pressed against the ground surface just before the excavation, there is no possibility for the loader to run on to stone, etc. after commencement of the excavation. Therefore, only when the resistance to excavation (that is, force of traction) exceeds a preset value, the detection of slip of the drive wheels is conducted.

Figure 3:
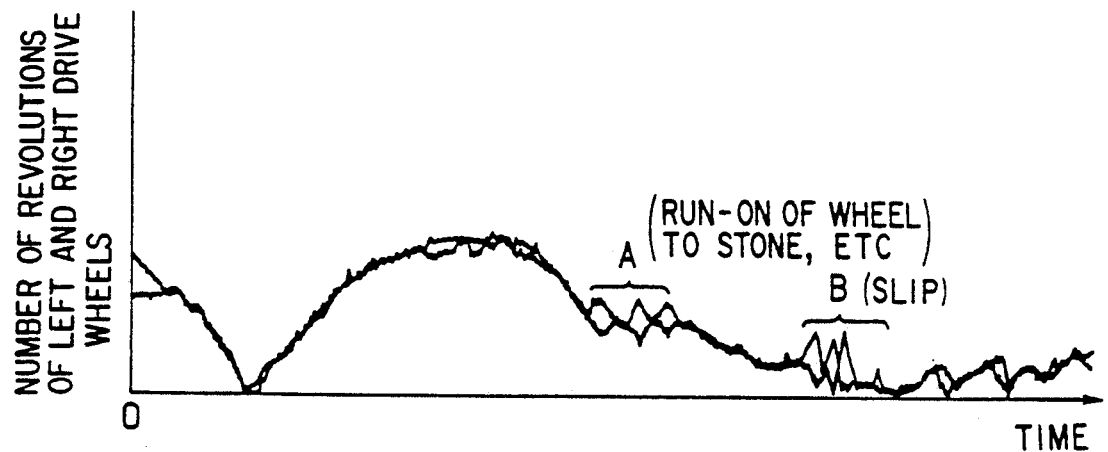
FIG. 3 is a diagram showing change in the number of revolutions of a pair of left and right drive wheels, respectively.

FIG. 3 shows change in the number of revolutions of the left and right drive wheels relative to time. The difference in the number of revolutions between the drive wheels varies with road surface condition, and there are regions where big difference in the number of revolutions between the drive wheels occurs, as indicated by reference characters A and B.

Figure 4:
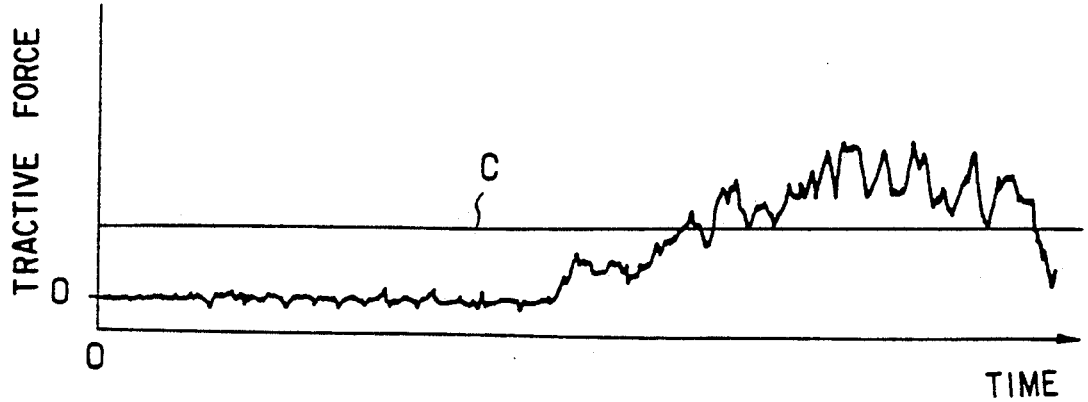
FIG. 4 is a diagram showing change in the force of traction of the wheel loader.

Whilst, FIG. 4 shows change in the force of traction relative to time, which corresponds to FIG. 3. In this drawing, reference character C denotes a preset value.

In both FIGS. 3 and 4, it is discriminated that the wheel loader slips in the region B where a big difference in the number of revolutions between the drive wheels occurs when the force of traction exceeds the preset value C.

That is to say; it is discriminated that the loader is slipping when the force of traction is more than the preset value and | the difference in the number of revolutions between the left and right drive wheels| at becomes more than a km/hr.

Figure 5:
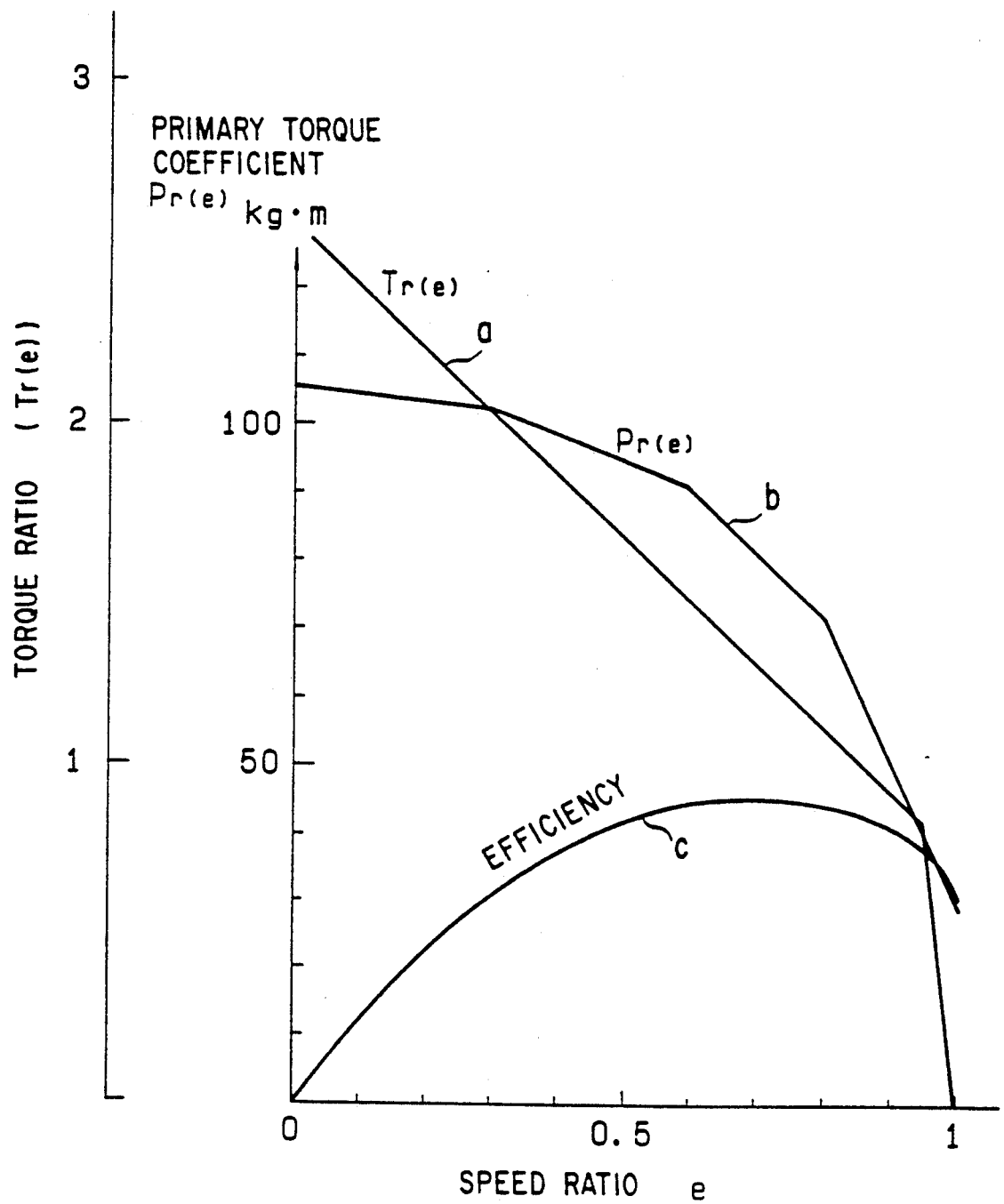
FIG. 5 is a diagram showing torque converter characteristics.

FIG. 5 shows the characteristics of a torque converter for use in a wheel loader. In this drawing, reference character "a" denotes torque ratio Tr(e), "b" primary torque coefficient Pr(e), and "c" efficiency. Speed ratio "e" is the ratio of the number of output shafts of the torque converter to the number of revolutions of the engine.

The primary torque coefficient Pr(e) is the absorbed torque when the number of revolutions of the input shaft of the torque converter is 1,000 rpm while the speed ratio is kept constant, the absorbed torque being proportional to the square of the number of revolutions when the speed is kept constant.

The step for calculating the traction characteristics in the CPO will be described below.

(1) To input the number of revolutions Ne of the engine and the number of revolutions Nt of output shafts of the torque converter.

(2) To calculate the speed ratio $$e = \frac{Nt}{Ne}$$

from the values of Ne and Nt.

(3) To find the torque ratio Tr(e) and the primary torque coefficient (Pr) from the graph shown in FIG. 5.

(4) To calculate the absorbed torque according to the following equation.

$$Te = Pr(e) \times \left(\frac{Ne}{1000}\right)^2$$

(5) To calculate the output torque of the torque converter according to the following equation.

$$T_{T/C} = Tr(e) \times Te$$

(6) To calculate the rotational speed V of the drive wheel and the force of traction Fve according to the following equation.

$$V = Nt/Fg$$

$$Fve = Fg \times T_{T/C} - I\frac{d\omega(T/C)}{dt}$$

wherein, Fg is the gear ratio, and
I is the inertia of the power line.

What is claimed is:

1. A method of preventing a wheel loader having left and right drive wheels from slipping comprising the steps of:
    monitoring wheel speeds at said left and right drive wheels of the wheel loader,
    detecting the occurrence of slip by detecting a difference of wheel speeds between said left and right drive wheels and a variation thereof, and
    controlling a clutch pressure for a clutch in a power train disposed between a prime mover of said wheel loader and said left and right drive wheels so as to increase a slip at said clutch in a slip-engagement in response to detection of occurrence of slippage.

2. A method of preventing a wheel loader from slipping as claimed in claim 1, wherein an number of revolutions of an engine is measured and a clutch pressure control is released when one of the number of revolutions is no greater than an engine preset value and when an implement on said wheel loader is in operation and the fluid pressure in a bottom chamber of a boom cylinder reaches at least a bottom pressure preset value occurs or is over the same.

3. A method of preventing a wheel loader from slipping as claimed in claim 2, characterized in that both the engine and bottom pressure preset values are 1,300 r.p.m. and 100 kg/cm², respectively.

4. A method of preventing a wheel loader from causing wheel slippage comprising the steps of:
    detecting rotation speed of respective left and right wheels by means of wheel speed sensors and generating left and right wheel speed indicative signals;
    detecting the occurrence of wheel slippage on the basis of a difference of rotation speeds of a pair of left and right drive wheels derived from said left and right wheel speed indicative signals and variation of said difference, in order to generate a wheel slippage detection signal; and
    controlling a clutch in a power train in response to said wheel slippage detection signal for establishing slip-engagement of said clutch to increase a slip at said clutch in said slip-engagement in response to the detection of occurrence of slippage.

5. A method of preventing a wheel loader from causing wheel slippage as set forth in claim 4, wherein said step of detection of occurrence of the wheel slippage is initiated when a tractive force exceeds a predetermined value.

6. A method of preventing a wheel loader from causing wheel slippage as set forth in claim 4, wherein said step of controlling clutch is disabled at an engine speed lower than or equal to 1300 r.p.m. and the implement is in operation and the fluid pressure in the bottom side chamber of a boom cylinder is greater than or equal to 100 kg/cm².

7. A method of preventing a wheel loader from causing wheel slippage comprising the steps of:
    detecting rotation speed of respective left and right wheels by means of wheel speed sensors and generating left and right wheel speed indicative signals;
    detecting an operation parameter of said wheel loader representative of active state of a work implement and generating a work implement active state indicative signal;
    detecting the occurrence of wheel slippage on the basis of a difference of rotation speeds of a pair of left and right drive wheels derived from said left and right wheel speed indicative signals and variation of said difference, in order to generate a wheel slippage detection signal; and
    controlling a clutch in a power train in response to said wheel slippage detection signal for establishing a slip-engagement of said clutch, said clutch control being enabled under the presence of said work implement active state indicative signal.

8. A method of preventing a wheel loader from causing wheel slippage comprising the steps of:
    detecting rotation speed of respective left and right wheels by means of wheel speed sensors and generating left and right wheel speed indicative signals;
    detecting a gear position of a power transmission in a power train disposed between a prime mover of the wheel loader and said left and right drive wheels to produce a gear position signal when a predetermined specific gear position is detected;
    detecting the occurrence of wheel slippage on the basis of a difference of rotation speeds of a pair of left and right drive wheels derived from said left and right wheel speed indicative signals and variation of said difference, in order to generate a wheel slippage detection signal; and
    controlling a clutch in the power train in response to said wheel slippage detection signal for establishing slip-engagement of said clutch, said clutch control being enabled under the presence of said gear position signal.

9. A method as set forth in claim 8, wherein said specific gear position is the first gear position.

10. A method of preventing a wheel loader from causing wheel slippage comprising the steps of:

detecting rotation speed of respective left and right wheels by means of wheel speed sensors and generating left and right wheel speed indicative signals;

detecting a revolution speed of a prime mover of said wheel loader to produce a revolution speed signal;

detecting the occurrence of wheel slippage on the basis of a difference of rotation speeds of a pair of left and right drive wheels derived from said left and right wheel speed indicative signals and variation of said difference, in order to generate a wheel slippage detection signal; and controlling a clutch in a power train in response to said wheel slippage detection signal for establishing slip-engagement of said clutch, said clutch control being enabled when said revolution speed signal represents a specific range of revolution speed of said prime mover.

11. A method of preventing a wheel loader from causing wheel slippage comprising the steps of:

detecting rotation speed of respective left and right wheels by means of wheel speed sensors and generating left and right wheel speed indicative signals;

detecting a bottom pressure of a boom cylinder driving a work implement to generate a pressure signal;

detecting the occurrence of wheel slippage on the basis of a difference of rotation speeds of a pair of left and right drive wheels derived from said left and right wheel speed indicative signals and variation of said difference, in order to generate a wheel slippage detection signal; and controlling a clutch in a power train in response to said wheel slippage detection signal for establishing slip-engagement of said clutch, said clutch control is enabled when said pressure signal represents a specific range of bottom pressure of said boom cylinder.

12. A traction control system for a wheel loader comprising:

first means for detecting wheel speed at a left drive wheel for generating a first drive wheel speed indicative signal;

second means for detecting wheel speed at a right drive wheel for generating a second drive wheel speed indicative signal;

third means for detecting predetermined wheel slip condition on the basis of said first and second wheel speed indicative signals and generating a wheel slippage detection signal; and fourth means for controlling engagement and disengagement on a clutch in a power train for transmitting a driving torque of prime mover to said left and right drive wheels, said fourth means being responsive to said wheel slippage detection signal to perform traction control mode operation for establishing a slip-engagement state of said clutch with a given clutch slippage for reduction of power transmission for said first and second drive wheels for resumption of traction on said left and right drive wheels.

13. A traction control system as set forth in claim 12, which further comprises:

fifth means for detecting an engine speed to produce an engine speed indicative signal; and said fourth means being responsive to said engine speed indicative signal representative of an engine speed lower than a predetermined low engine speed criterion for disabling said traction control mode operation.

14. A traction control system as set forth in claim 12, which further comprises:

sixth means for detecting active state of a work implement for generating an implement active state indicative signal; and said fourth means being responsive to said implement active state indicative signal for disabling said traction control mode operation.

15. A traction control system as set forth in claim 12, which further comprises:

seventh means for detecting a fluid pressure in a selected chamber of a boom cylinder to produce a boom cylinder pressure indicative signal; and said fourth means being responsive to said boom cylinder indicative signal representative of the fluid pressure in said selected chamber greater than a predetermined value for disabling said traction control mode operation.

16. A traction control system as set forth in claim 12, wherein said third means detects the predetermined wheel slip condition on the basis of a difference of said first and second wheel speed indicative signals and variation of said difference.

17. A traction control system as set forth in claim 12, which further comprise:

eighth means for detecting tractive force to produce a tractive force indicative signal; and said third means being responsive to said tractive force indicative signal representative of a tractive force exceeding a predetermined value for initiating detection of said wheel slippage.

18. A traction control system as set forth in claim 12, which further comprises:

ninth means for detecting a selected transmission speed ratio to produce a drive range indicative signal; and said third means being responsive to said drive range indicative signal for initiating detection of the wheel slippage.

19. A traction control system as set forth in claim 18, wherein said specific drive range is a first forward speed ratio.

* * * * *